United States Patent
Robbins et al.

(10) Patent No.: US 9,477,008 B2
(45) Date of Patent: Oct. 25, 2016

(54) METHOD AND SYSTEM OF TRANSMITTING ACOUSTIC SIGNALS FROM A WELLBORE

(75) Inventors: Carl A. Robbins, Houston, TX (US); Li Gao, Katy, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 1589 days.

(21) Appl. No.: 12/918,552

(22) PCT Filed: Aug. 13, 2009

(86) PCT No.: PCT/US2009/053731
§ 371 (c)(1),
(2), (4) Date: Aug. 20, 2010

(87) PCT Pub. No.: WO2011/019351
PCT Pub. Date: Feb. 17, 2011

(65) Prior Publication Data
US 2011/0164468 A1 Jul. 7, 2011

(51) Int. Cl.
*E21B 47/16* (2006.01)
*G01V 11/00* (2006.01)

(52) U.S. Cl.
CPC ............ *G01V 11/002* (2013.01); *E21B 47/16* (2013.01)

(58) Field of Classification Search
USPC .................................. 340/853.7; 367/82–83
See application file for complete search history.

(56) References Cited

U.S. PATENT DOCUMENTS

| | | | | |
|---|---|---|---|---|
| 5,576,703 | A | * | 11/1996 | MacLeod et al. ......... 340/854.4 |
| 5,914,911 | A | | 6/1999 | Babour |
| 6,177,882 | B1 | | 1/2001 | Ringgenberg |
| 7,301,472 | B2 | | 11/2007 | Kyle |
| 2003/0072218 | A1 | | 4/2003 | Smith |

OTHER PUBLICATIONS

International Search Report and Written Opinion for PCT Patent Application No. PCT/US2009/053731, filed Aug. 13, 2009.
Intellectual Property Office of Singapore Written Opinion, Application No. 201200803-3, mailed Oct. 4, 2013.

* cited by examiner

*Primary Examiner* — Albert Wong
(74) *Attorney, Agent, or Firm* — John W. Wustenberg; Baker Botts L.L.P.

(57) ABSTRACT

Transmitting acoustic signals from a wellbore. At least some of the illustrative embodiments are methods including transmitting an acoustic signal comprising downhole data, receiving the acoustic signal (the receiving by a receiver disposed within the internal diameter of a casing in the wellbore) converting the acoustic signal to a corresponding first electromagnetic signal, and inducing a second electromagnetic signal in a tubing responsive to the first electromagnetic signal.

23 Claims, 4 Drawing Sheets

METHOD AND SYSTEM OF TRANSMITTING ACOUSTIC SIGNALS FROM A WELLBORE

BACKGROUND

Modern oil field operations demand a great quantity of information relating to the parameters and conditions encountered downhole. Such information includes characteristics of the earth formations throughout the wellbore, and data relating to the size, direction and configuration of the wellbore. In some cases after the drilling has been completed, the collection of information relating to conditions downhole is performed and the information sent to the surface by acoustic telemetry. In particular, in acoustic telemetry various parameters of the borehole and/or earth's formations are measured using a Bottom-Hole Assembly (BHA) connected at the end of a tubing (e.g., continuous tubing or joint tubing), and acoustic telemetry techniques are used to transmit the information to surface. However, the acoustic signals weaken when propagating over a long distances making difficult recovery of the various parameters of the borehole and/or earth's formations.

BRIEF DESCRIPTION OF THE DRAWINGS

For a detailed description of the various embodiments, reference will now be made to the accompanying drawings in which.

NOTATION AND NOMENCLATURE

Certain terms are used throughout the following description and claims to refer to particular system components. This document does not intend to distinguish between components that differ in name but not function.

In the following discussion and in the claims, the term "comprising" is used in an open-ended fashion, and thus should be interpreted to mean "comprising, but not limited to . . . ". Also, the terms "couple" or "couples" are intended to mean either an indirect or direct electrical or mechanical connection, as the context may require. Thus, if a first device couples to a second device, that connection may be through a direct connection, or through an indirect connection via other devices and connections.

"Electromagnetic signal" shall mean a signal propagating along a conductor (e.g., a tubing or a wire).

"Electromagnetic wave" shall mean a wave propagating through air.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

The various embodiments were developed in the context of downhole tools operating in a production environment (i.e., after the wellbore has been drilled and cased), and thus the description that follows is based on the production environment; however, the various systems and methods find application not only in downhole tools in production environment, but may also find application in measuring-while-drilling (MWD), logging-while-drilling tools (LWD), and slickline (memory) logging. Thus, the production environment shall not be construed as a limitation as to the applicability of the various embodiments.

Figure 1:
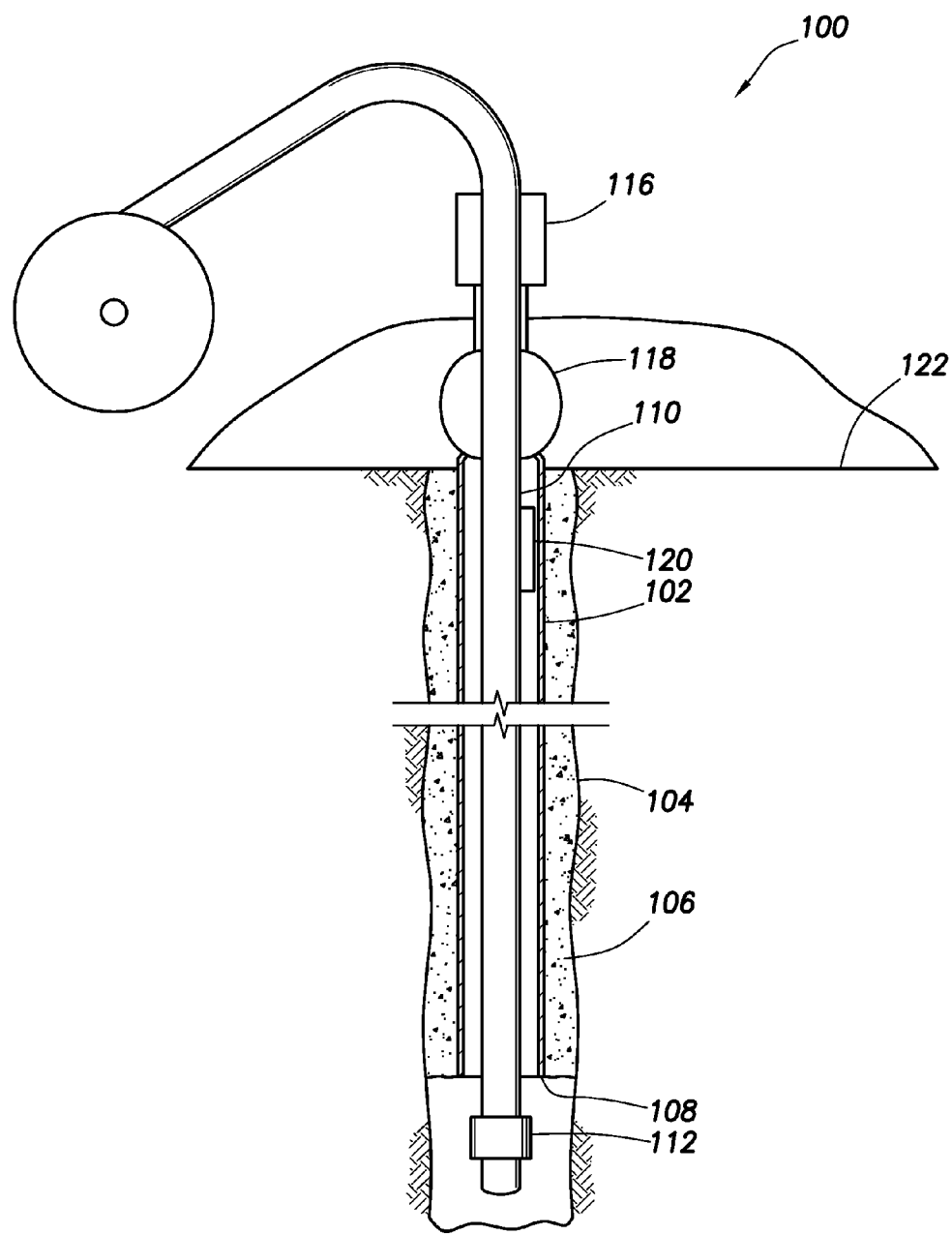
FIG. 1 shows a tubing system in accordance with at least some of the embodiments.

FIG. 1 shows a perspective, cross-sectional view of a tubing system 100 operating in a production environment. In the production environment the drilling operation has completed, and the casing 102 is cemented in place by disposing cement 106 between the outer diameter of the casing 102 and the wellbore 104. A coiled tubing 110 is disposed within the casing 102. In some embodiments, an injector 116 lowers the coiled tubing 110 into the wellbore 104 or pulls the coiled tubing 110 out of the wellbore 104. A stripper/packer 118 provides a seal around the coiled tubing 110 to isolate the pressure from the wellbore 104. In the embodiments of FIG. 1, the coiled tubing 110 is the route by which at least some of the hydrocarbons extracted from the formation are conveyed to the surface. In other embodiments, the coiled tubing 110 may be used in a fracturing (or "frac") operation and thus used to convey fracing fluid downhole. Although the exemplary embodiments of FIG. 1 illustrate continuous tubing, such as coiled tubing 110, any other production environment tubing (e.g., individual pipe section with joints between them) may be used.

Still referring to FIG. 1, the coiled tubing 110 couples on a distal end to one or more downhole tools 112 to obtain information related to wellbore 104 conditions and/or information related to the formation surrounding the wellbore 104 (e.g., logging tools, such as a gamma tool or a density tool). In the particular embodiments, the coiled tubing 110 and the downhole tool 112 extend beyond the lower portion 108 of the casing 102. In other embodiments, the coiled tubing 110 and the downhole tool 112 are fully within the casing 102. The downhole tool 112 obtains downhole data related to wellbore 104 conditions (e.g., temperature or pressure) and/or downhole data related to formation surrounding the wellbore 104 (e.g., water saturation), and the downhole tool 112 transmits the downhole data toward the surface.

In particular, the downhole data is transmitted by modulating the downhole data in a telemetry signal. In some embodiments, the downhole tool 112 is configured to modulate the downhole data in the telemetry signal by any of various modulating techniques, such as Frequency Shift Keying (FSK), Quadrature Amplitude Modulation (QAM) or Discrete Multi-Tone (DMT). In the particular embodiments, the telemetry signal comprising the downhole data is an acoustic signal, and the downhole tool 112 is configured to transmit the downhole data by inducing (e.g., by way of an acoustic transreceiver) the acoustic signal along the coiled tubing 110. In other embodiments, the telemetry signal comprising the downhole data is an acoustic signal that is induced in drilling fluid (e.g., a pressure pulse signal)

within the wellbore by the downhole tool 112 (e.g., a mud pulser). In such a situation, the acoustic signals propagate along the drilling fluid.

In related art, to detect the acoustic signal propagating along coiled tubing 110 at the surface, a device in contact with the coiled tubing 110 detects the vibrations in the coiled tubing 110. However, when the acoustic signal propagates along the coiled tubing over long distances, the acoustic signal fades making difficult the detection of the acoustic signal at the surface. In the case of joint tubing, portions of the acoustic signal reflect at the joints in the tubing, and the reflected acoustic signal interferes with acoustic signal propagating along the joint tubing. Thus, over a long distance the acoustic signal becomes noisy.

In accordance with at least some embodiments, a repeater system 120 is coupled to the coiled tubing 110 within the internal diameter of the casing 102. The repeater system 120 is configured to convert the acoustic signal from the downhole tool 112 to corresponding electromagnetic signal or electromagnetic wave. In the illustrative case of FIG. 1, the repeater system 120 transmits the electromagnetic signal or the electromagnetic waves to the surface 122.

In some embodiments, the repeater system 120 is coupled to the outer surface of the coiled tubing 110 by a spring clamp or by a band clamp. In other embodiments, the repeater system 120 is coupled to the outer surface of the coiled tubing 110 by any suitable means, such as a fastener or a snap fit connection. In yet still other embodiments, the repeater system 120 may be integrated in the coiled tubing 110. The repeater system 120 is placed at a particular depth (e.g., 1000 feet to 5000 feet) within the wellbore 104. In some embodiments, the repeater system 120 is enclosed in a protective flask (e.g., Dewar flask) to protect the repeater system 120 from harsh conditions in the wellbore 104.

Figure 2:
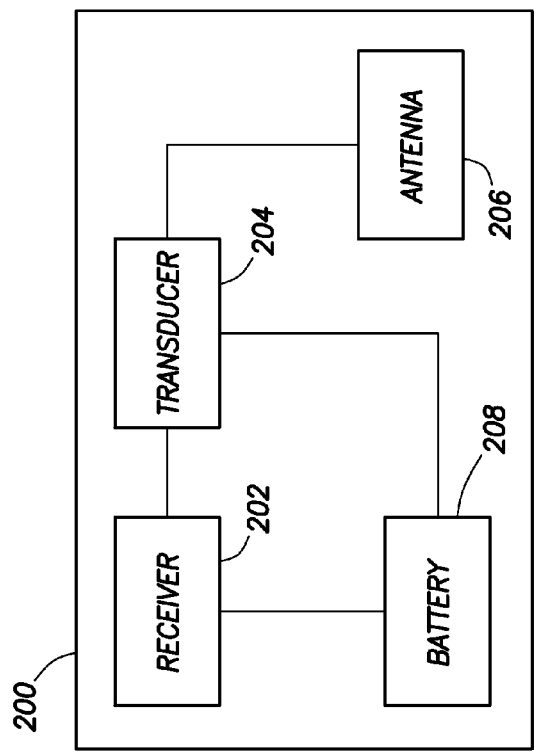
FIG. 2 shows a repeater system in accordance with at least some of the embodiments.

FIG. 2 shows the repeater system 200, similar to the repeater system 120 of the embodiments of FIG. 1. In particular, the repeater system 200 comprises a receiver 202, a transducer 204, an antenna 206 and a battery 208. The battery 208 is electrically coupled to the receiver 202 and the transducer 204, and the battery 208 provides operating voltage and current to the receiver 202 and the transducer 204. The receiver 202 detects the acoustic signal transmitted by the downhole tool propagating along the coiled tubing. In a particular embodiment, the receiver 202 is an accelerometer that detects the vibrations in the coiled tubing 110 caused by the acoustic signal. In other embodiments, the receiver 202 is any device capable of detecting the acoustic signal, such as a microphone. The receiver 202 detects the acoustic signal and sends an electrical signal corresponding to acoustic signal to the transducer 204. The transducer 204 is electrically coupled to the receiver 202 to receive the electrical version of the acoustic signal and convert the acoustic signal to a corresponding electromagnetic antenna feed signal.

In some embodiments, the transducer 204 comprises electronic devices such as a modulator/demodulator, a microprocessor, memory and amplifiers. The transducer 204 demodulates the electrical version of the acoustic signal based on the modulation technique (e.g., FSK, QAM or DMT). The downhole data from the demodulated electrical version of the acoustic signal is recovered and then used by the transducer 204 to create an electromagnetic antenna feed signal. When the transducer 204 creates the electromagnetic antenna feed signal, the transducer 204 modulates the recovered downhole data in the electromagnetic antenna feed signal by any of various modulating techniques, such as FSK, QAM or DMT. In some embodiments, the frequency of the electrical version of the acoustic signal is different from the frequency of the electromagnetic antenna feed signal. The electromagnetic antenna feed signal is fed to the antenna 206, and the antenna 206 induces a corresponding electromagnetic signal in the coiled tubing to transmit downhole data to the surface. The antenna 206 is any suitable antenna that transmits electromagnetic waves (e.g., a gap sub antenna) or transmits electromagnetic signal (e.g., a toroid transmitter). In some embodiments, the antenna 206 (e.g., a gap sub antenna) transmits electromagnetic waves and the electromagnetic waves transmitted by the antenna 206 induce a corresponding electromagnetic signal in the coiled tubing 110. In other embodiments, the antenna 206 (e.g., a toroid transmitter) directly induces an electromagnetic signal in the coiled tubing 110.

Figure 3:
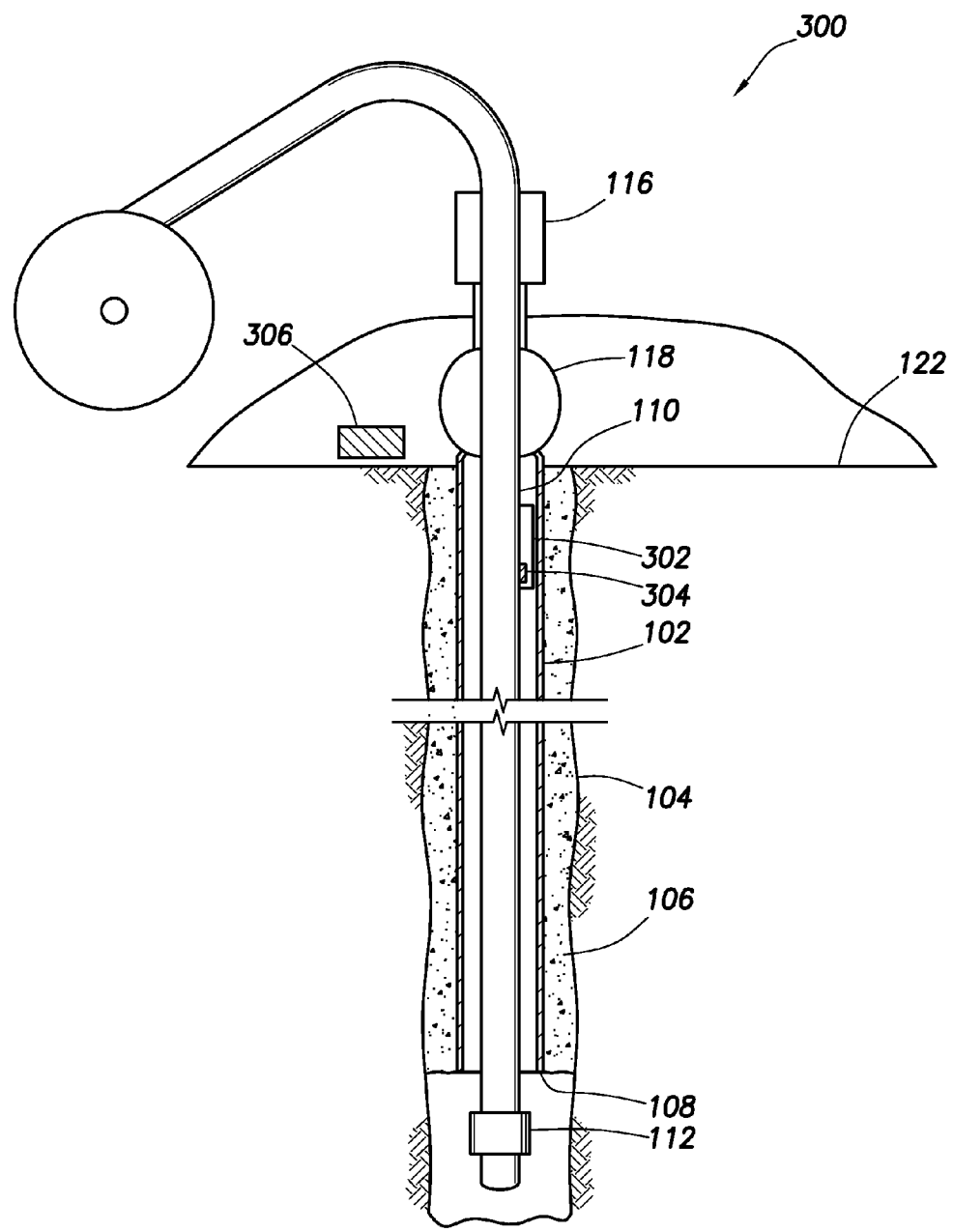
FIG. 3 shows a tubing system in accordance with at least some of the embodiments.

FIG. 3 shows a tubing system 300 similar to the embodiments of FIGS. 1 and 2, but the repeater system 302 comprises an antenna 304 configured to launch an electromagnetic wave. In the particular embodiments, the antenna 304 is any antenna (e.g., a gap sub antenna, or a Yagi antenna) that transmits electromagnetic waves. Like the embodiments of FIG. 2, the repeater system 302 in the embodiments of FIG. 3 comprises a receiver (e.g., accelerometer) that detects the acoustic signals transmitted from the downhole tool 112. A transducer converts the electrical version of the acoustic signals to an electromagnetic antenna feed signal. The antenna 304 receives the electromagnetic antenna feed signal from the transducer and transmits corresponding electromagnetic wave through the air within the casing 102. In some embodiments, the electromagnetic wave transmitted by the antenna 304 induces a corresponding electromagnetic signal in the tubing 110. The electromagnetic signal then propagates along the tubing 110 to the surface 122.

A receiver 306 is placed on the surface 122 to detect the electromagnetic signal propagating along the tubing 110. In the embodiments of FIG. 3, the receiver 306 is a magnetometer, and the magnetometer is proximate (e.g., within 1 to 4 feet) to the tubing 110. In other embodiments, the magnetometer is coupled to the tubing 110, or placed proximate to the stripper/packer 118. The magnetometer detects magnetic fields associated with the electromagnetic signal induced in the tubing 110. The strength of the magnetic fields associated with the electromagnetic signal is proportional to the length of the conductor along which the electromagnetic signal propagates. In the particular embodiments, the electromagnetic signal propagates along a substantially long tubing 110 (e.g., 1000 feet), and thus the magnetic fields associated with the electromagnetic signal have sufficient strength to detected by a magnetometer placed away (e.g., up to 4 feet away) from the tubing 110. In some embodiments, a computer system may be coupled to the receiver 306 to further process the electromagnetic signals detected by the receiver 306.

Figure 4:
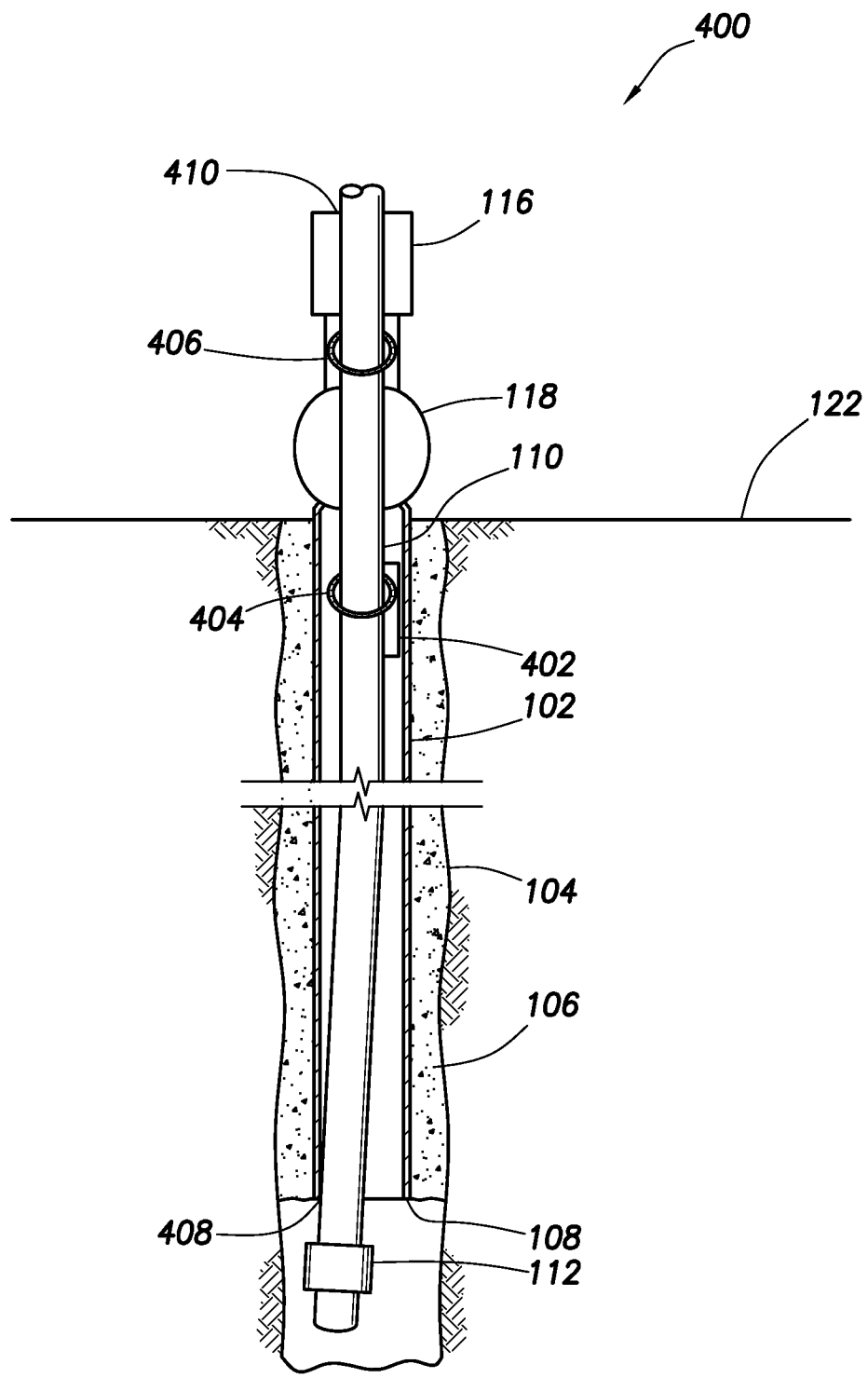
FIG. 4 shows a tubing system in accordance with at least some of the embodiments.

FIG. 4 shows a tubing system 400 similar to the embodiments of FIGS. 2 and 3, but the antenna in the repeater system 402 is a toroid transmitter 404. In the particular embodiment, the toroid transmitter 404 encircles the tubing 110, and directly induces an electromagnetic signal in the tubing 110 to transmit the downhole data to the surface 122. Consider, for the purpose of explanation, that the tubing 110 abuts the casing 102 at a first location 408 within the wellbore 104, and the tubing 110 abuts the injector 116 at a second location 410 above the surface 122. Although in the exemplary embodiments of FIG. 4 the first location 408 is near the downhole tool 112, the tubing 110 may abut the casing 102 at any location that is lower than the toroid transmitter 404 within the wellbore 104. The abutting of the tubing 110 at the first location 408 and the second location 410 creates a closed electrical loop comprising the casing 102, the tubing 110 and the injector 116. In the exemplary embodiments of FIG. 4, the closed electrical loop created by the casing 102, the tubing 110 and the injector 116 approximates a single loop secondary winding of a transformer, and the toroid transmitter 404 approximates a primary winding of the transformer.

Like the embodiments of FIG. 2, the repeater system 402 in the embodiments of FIG. 4 comprises a receiver (e.g., accelerometer) that detects the acoustic signals from the downhole tool 112. A transducer converts the electrical version of the acoustic signal to electromagnetic antenna feed signal. The toroid transmitter 404 receives the electromagnetic antenna feed signal, and the toroid transmitter 404 induces a corresponding electromagnetic signal in the tubing 110. Analogous to a transformer, the primary winding of the transformer (i.e., the toroid transmitter 404) receives a varying current (i.e., the electromagnetic antenna feed signal), and induces corresponding a current (i.e., electromagnetic signal) in the secondary winding of the transformer (i.e., the tubing). The electromagnetic signals (i.e., the current) induced in the tubing 110 propagates along the tubing 110 to the surface 122.

A receiver 406 is placed proximate to the surface to detect the electromagnetic signals propagating along the coiled tubing 110. In the particular embodiments, the receiver 406 is a toroid receiver. Continuing with the exemplary embodiments of FIG. 4, the toroid receiver 406 is disposed between the injector 116 and the stripper/packer 118, and the toroid receiver 406 encircles the coiled tubing 110. In other embodiments, the toroid receiver 406 may be placed at any location above the surface 122 and along coiled tubing 110. When the toroid receiver 406 detects the electromagnetic signal, the toroid receiver 406 detects a current consequent of the electromagnetic signal induced in the in coiled tubing 110. In some embodiments, a computer system may be coupled to the receiver 306 to further process the electromagnetic signals detected by the receiver 306.

In an alternative embodiment, the receiver 406 of the embodiments of FIG. 4 is a magnetometer of the embodiments of FIG. 3. In such a case, the magnetometer is placed proximate (e.g., within 4 feet) to the tubing 110, and the magnetometer detects magnetic fields associated with the electromagnetic signal induced in the tubing 110 by the toroid transmitter 404.

Referring back to FIG. 3, in an alternative embodiment, the receiver 306 is a toroid receiver of the embodiments of FIG. 4. In such a case, the toroid receiver encircles the tubing 110 and detects the electromagnetic signal induced in the tubing 110 by the electromagnetic waves produced by the antenna 304.

Figure 5:
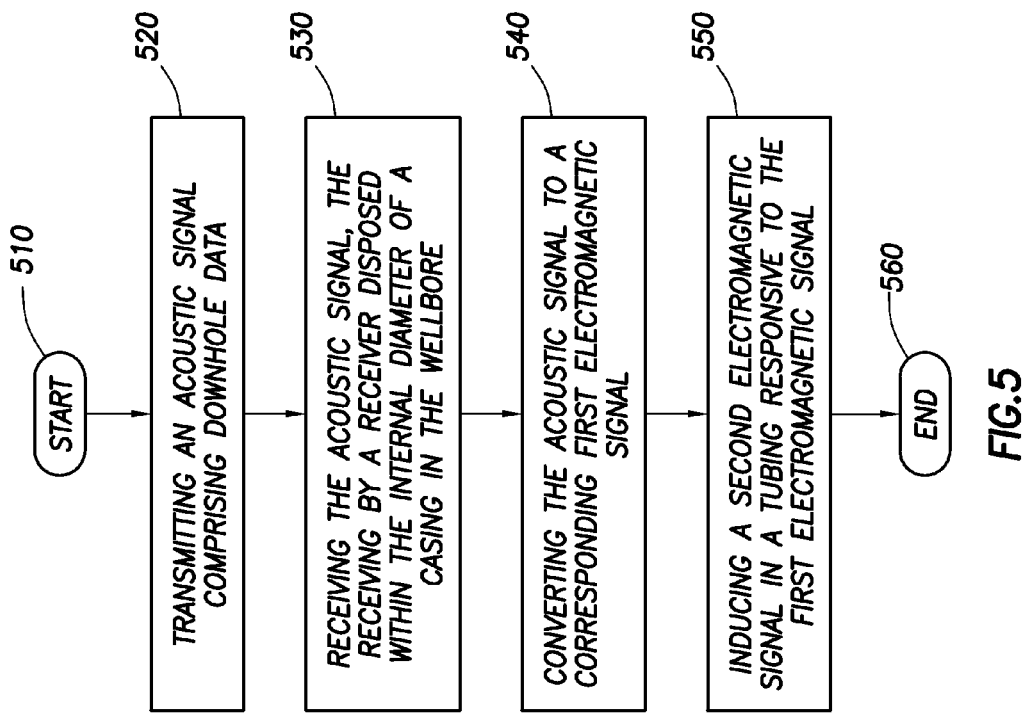
FIG. 5 shows a method in accordance with at least some of the embodiments.

FIG. 5 shows a method in accordance with at least some of the embodiments. In particular, method starts (block 510) and proceeds to transmitting an acoustic signal comprising downhole data (block 520). In some embodiments, the acoustic signal propagates along tubing. In other embodiments, the acoustic signal propagates along drilling fluid in a wellbore. Next, the acoustic signal is received by a receiver within the internal diameter of the casing (block 530). Thereafter, the acoustic signal is converted to a corresponding first electromagnetic signal (block 540). In some embodiments, the first electromagnetic signal is an electromagnetic antenna feed signal. Finally, a second electromagnetic signal is induced in the tubing, the second electromagnetic signal responsive to the first electromagnetic signal (block 550), and the method then ends (block 560).

The above discussion is meant to be illustrative of the principles and various embodiments of the present invention. Numerous variations and modifications will become apparent to those skilled in the art once the above disclosure is fully appreciated. For example, the some embodiments the repeater system detects, by way of a pressure sensor, acoustic signals induced in the drilling fluid (e.g., pressure pulse signals) transmitted from the downhole tool. In some cases, instead of detecting at the surface electromagnetic signal or magnetic fields associated with the electromagnetic signal, the electromagnetic waves produced by the antenna in the repeater system are directly detected by an electromagnetic wave receiver (e.g., a dipole antenna or a toroid receiver) proximate to the surface. Moreover, the various systems and methods find application not only in downhole tools in production environment, but may also find application in measuring-while-drilling (MWD), logging-while-drilling tools (LWD), and slickline (memory) logging. In some embodiments, the receiver is configured to convert the acoustic signal to the electromagnetic antenna feed signal. Stated otherwise, the receiver converts the acoustic signal to the electromagnetic antenna feed signal and directly feeds the electromagnetic antenna feed signal to the antenna. Additionally, the tubing in the various embodiments is not limited to continuous tubing (e.g., coiled tubing), but joint tubing (e.g., individual pipe section with joints between them) may equivalently be used. It is intended that the following claims be interpreted to embrace all such variations and modifications.

What is claimed is:

1. A system comprising:
    a repeater system coupled to a tubing in a wellbore, the repeater system comprising:
        a first receiver that detects an acoustic signal;
        a transducer coupled to the first receiver that converts the acoustic signal to a first electromagnetic signal; and
        an antenna coupled to the transducer, the antenna induces a second electromagnetic signal in the tubing
    a second receiver disposed outside a casing of the wellbore, and the second receiver proximate to the tubing, the second receiver detects the second electromagnetic signal propagating in the tubing.

2. The system as defined in claim 1 wherein the first receiver detects vibrations in the tubing caused by the acoustic signal.

3. The system as defined in claim 1 wherein the first receiver is an accelerometer.

4. The system as defined in claim 1 wherein the antenna is a toroid transmitter, and the toroid transmitter induces the second electromagnetic signal into the tubing.

5. The system as defined in claim 1 wherein the antenna is a gap sub antenna, and the gap sub antenna transmits an electromagnetic wave within the wellbore, the electromagnetic wave induces the second electromagnetic signal in the tubing.

6. The system as defined in claim 1 wherein the tubing is at least one selected from the group consisting of: joint tubing; and coiled tubing.

7. The system as defined in claim 1 wherein the acoustic signal is at least one selected from the group consisting of: an acoustic signal propagating along the tubing; and an acoustic signal propagating along drilling fluid in the wellbore.

8. A method comprising:
transmitting an acoustic signal comprising downhole data;
receiving the acoustic signal, the receiving by a receiver disposed within the internal diameter of a casing in the wellbore;
converting the acoustic signal to a corresponding first electromagnetic signal; and
inducing a second electromagnetic signal in a tubing responsive to the first electromagnetic signal, the second electromagnetic signal propagates in the tubing to a point outside the casing.

9. The method as defined in claim 8 wherein the transmitting the acoustic signal further comprising transmitting by a downhole tool.

10. The method as defined in claim 8 wherein the transmitting the acoustic signal further comprises transmitting an acoustic signal that at least one selected from the group consisting of: propagates along the tubing; and propagates along drilling fluid in the wellbore.

11. The method as defined in claim 8 wherein the receiving further comprising detecting vibrations in the tubing caused by the acoustic signal.

12. The method as defined in claim 8 wherein the receiving further comprising receiving by an accelerometer disposed proximate to the tubing.

13. The method as defined in claim 8 wherein the inducing the second electromagnetic signal further comprising inducing the second electromagnetic signal in the tubing by a toroid transmitter.

14. The method as defined in claim 8 wherein the inducing the second electromagnetic signal further comprising transmitting an electromagnetic wave within the casing by a gap sub antenna, the electromagnetic wave inducing the second electromagnetic signal in the tubing.

15. The method as defined in claim 8 wherein the converting further comprising converting by a transducer.

16. The method as defined in claim 8 further comprising detecting at surface the second electromagnetic signal by way of at least one selected from the group consisting of: a magnetometer; and a toroid receiver.

17. A system comprising:
a downhole tool within a wellbore that induces an acoustic signal;
a repeater system coupled to a tubing within a casing in the wellbore, the repeater system comprising:
a first receiver that detects the acoustic signal;
a transducer coupled to the second receiver that converts the acoustic signal to a first electromagnetic signal; and
an antenna coupled to the transducer that induces a second electromagnetic signal, the second electromagnetic signal induced in the tubing;
a second receiver disposed outside the casing, and the second receiver proximate to the tubing, the second receiver detects the second electromagnetic signal propagating in the tubing.

18. The system as defined in claim 17 wherein the receiver detects vibrations in the tubing caused by the acoustic signal.

19. The system as defined in claim 17 wherein the first receiver is an accelerometer.

20. The system as defined in claim 17 wherein the antenna is a toroid transmitter, and the toroid transmitter induces the second electromagnetic signal into the tubing.

21. The system as defined in claim 17 wherein the antenna is a gap sub antenna, and the gap sub antenna transmits an electromagnetic wave within the casing, the electromagnetic wave induces the second electromagnetic signal in the tubing.

22. The system as defined in claim 17 wherein the tubing is at least one selected from the group consisting of: joint tubing; and coiled tubing.

23. The system as defined in claim 17 wherein the downhole tool induces the acoustic signal in at least one selected from the group consisting of: the tubing; and drilling fluid in the wellbore.

* * * * *